(12) United States Patent
Hesse

(10) Patent No.: US 9,322,970 B2
(45) Date of Patent: Apr. 26, 2016

(54) OPTICAL SYSTEM FOR COUPLING LIGHT FROM POINT LIGHT SOURCES INTO A FLAT LIGHT GUIDE

(76) Inventor: Andreas Hesse, Wenden-Gerlingen (DE)

(*) Notice: Subject to any disclaimer, the term of this patent is extended or adjusted under 35 U.S.C. 154(b) by 0 days.

(21) Appl. No.: 13/531,067

(22) Filed: Jun. 22, 2012

(65) Prior Publication Data

US 2012/0328242 A1 Dec. 27, 2012

(30) Foreign Application Priority Data

Jun. 25, 2011 (DE) .......................... 10 2011 105 571

(51) Int. Cl.
*G02B 6/26* (2006.01)
*F21V 8/00* (2006.01)

(52) U.S. Cl.
CPC .............. *G02B 6/0018* (2013.01); *G02B 6/002* (2013.01); *G02B 6/0023* (2013.01); *G02B 6/0028* (2013.01); *G02B 6/0031* (2013.01)

(58) Field of Classification Search
CPC .............. G02B 6/34; G02B 6/26; G02B 6/42
USPC .......................................... 385/15, 31, 36, 39
See application file for complete search history.

(56) References Cited

U.S. PATENT DOCUMENTS

| 6,607,286 | B2* | 8/2003 | West et al. .................... 362/255 |
| 7,438,444 | B2* | 10/2008 | Pao et al. ...................... 362/327 |
| 7,628,520 | B2* | 12/2009 | Salter et al. .................... 362/511 |
| 8,059,315 | B2* | 11/2011 | Endo et al. ..................... 358/474 |
| 2007/0183040 | A1 | 8/2007 | Sinyugin et al. |
| 2009/0128735 | A1 | 5/2009 | Larson et al. |
| 2010/0046234 | A1* | 2/2010 | Abu-Ageel ................... 362/308 |

OTHER PUBLICATIONS

European Search Report and Written Opinion dated Oct. 11, 2012 issued in European Patent Application No. 12 173 098.0, 4 pages. English language machine translation provided.

* cited by examiner

*Primary Examiner* — Jennifer Doan
(74) *Attorney, Agent, or Firm* — Grossman Tucker Perreault & Pfleger PLLC

(57) ABSTRACT

The invention relates to an optical system for coupling light from at least one approximately point-shaped light source such as a LED into a flat light guide made of a transparent material such as glass or plastic. The inventive system is characterized in that the point light source is arranged above a surface of the light guide and is associated with an optical element, which couples the light from the point light source into the flat light guide at the surface thereof, wherein the in-coupled light satisfies the condition of the critical angle for total reflection and remains inside the flat light guide until controlled out-coupling.

5 Claims, 3 Drawing Sheets

Figure 1:
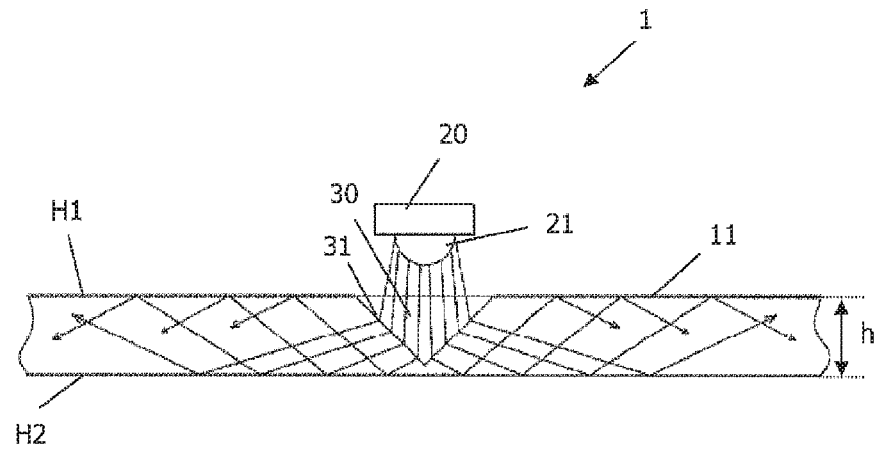

OPTICAL SYSTEM FOR COUPLING LIGHT FROM POINT LIGHT SOURCES INTO A FLAT LIGHT GUIDE

CROSS-REFERENCE TO RELATED APPLICATION

This application claims priority to German Application No. 10 2011 105 571.5 filed on Jun. 25, 2011, the entire content of which is incorporated herein by reference.

The invention relates to an optical system for coupling light from at least one approximately point-shaped light source such as a LED into a flat light guide made of a transparent material such as glass or plastic.

While LEDs were originally intended purely for optical display functions their use has meanwhile spread to illuminants in powerful lamps, which fact may be mainly attributed to technical improvements in the illuminating power of LEDs. Even if these LEDs have become very efficient and inexpensive in recent times, LEDs, excluding OLEDs (organic light emitting diodes), are extremely glaring point light sources which can hardly be directly inserted in lamps because of their luminance. Normally such power LEDs are embedded in line or flat light guides either using collimators for beam focusing, opal translucent diffusion optics or front side in-coupling of light in order to render light energy that is supplied homogenous.

Particularly the coupling of LED light into line or flat light guides turned out to be advantageous, since this approach supports lamp construction engineers in their desire for homogeneously illuminated surfaces and high efficiency of the lamp. In the usual coupling of light into the light guide, the light of one or more LEDs is coupled into the mostly polished and/or lens-shaped convexly curved front sides of the light guide. But due to the absorption of the light in the material and the inhomogeneity of the light intensity within the optical fiber which is involved, such coupling of light into the front side of the light guide bears disadvantages which limit the efficiency and size of a flat light guide that can be employed in a reasonable manner.

It is an object of the present invention to remove the above-described drawback of conventional optical systems in which light from point light sources is coupled into a flat light guide. This object is surprisingly achieved by an optical system comprising the features of claim 1. The system of the invention is characterized in that the point light source is arranged above a surface of the light guide and that an optical element is associated with it, which couples the light from the point light source into the flat light guide at the surface thereof, wherein the in-coupled light satisfies the conditions of the critical angle for total reflection and remains inside the light guide until controlled out-coupling. The term "surface of a flat light guide" does not mean a front side of the flat light guide but a major surface of the light guide which for instance in a rectangular flat light guide is defined by the width and the length of the light guide. Its thickness is smaller or much smaller than the said width or length. The two major surfaces or surfaces of a plate-like light guide thus correspond to the two largest opposing boundary surfaces of the flat light guide.

By the fact that the light from the at least one point light source is coupled into the flat light guide not at the outer front side thereof but at one of its two surfaces, a homogeneous light distribution can be provided within the flat light guide even if in the inventive optical system the density decreases from the in-coupling position as with conventional flat light guides, depending on the absorption of the light. For light in-coupling, the system of the invention includes for each point light source one associated optical element, which in-couples the light from the associated point light source at one (major) surface of the flat light guide in such a manner that the in-coupled light satisfies the conditions of the critical angle of total internal reflection and can remain inside the flat light guide until controlled out-coupling. Such a controlled out-coupling can be adjusted for example by a structuring such as a roughening of a corresponding region of a (major) surface of the flat light guide. According to the invention, light rays are coupled into the flat light guide from above a (major) surface thereof by means of the optical element(s).

Such an optical element for coupling light from a point light source into a flat light guide at a surface thereof can be designed in various different ways. There can be provided for instance in-coupling surfaces that are incorporated in the flat light guide in a manner such as to be facing the respective point light source and immersed with respect to the respective major surface of the flat light guide, and the light from the point light source enters into the flat light guide by a refraction of the light at these immersed in-coupling surfaces. Depending on the specific embodiment, these in-coupling surfaces can be planar or also curved. For maximizing these in-coupling surfaces, the same can extend over a major part of the height of the flat light guide, particularly in the form of boundary surfaces of a recess in the flat light guide which is cone-shaped.

In a further embodiment of the invention it can also be provided that such a recess, for instance in the form of a conical recess, is not arranged on the surface of the flat light guide which faces the light source but on the opposing surface. Such a recess in the flat light guide produces at least one coupling surface in the said light guide which reflects the light from the point light source into the flat light guide by means of total internal reflection. It can also be provided that the surfaces of the recess are reflective or that additional reflecting elements are arranged in the recess, for reflecting light from the associated point light radiator which penetrates into the flat light guide on the opposing surface thereof in a direction between the two surfaces of the flat light guide, the light by means of total internal reflection on both surfaces remaining inside the flat light guide until it reaches the out-coupling regions of the flat light guide where it leaves the light guide.

Preferably, the recesses in the flat light guide in the two embodiments described or the in-coupling surfaces produced by these recesses can be adapted to the respective design of the light source, for optimizing the in-coupling process.

For designing the coupling optical element, a further embodiment of the optical system of the invention provides that on the surface of the flat light guide facing the respective point light source at least one local elevation of the light guide is provided which includes a central cone-shaped recess, and the light from the point light source is in-coupled via the boundary surface thereof.

For designing such an in-coupling optical element it can also be provided that an opening, for example in the form of a hole, is provided in the surface of the flat light guide, a reflecting element e.g. in the form a cone having a reflective cone surface being provided in the said hole and said reflecting element coupling the light from the point light source which is incident vertically to the surface of the flat light guide into the flat light guide at the front surface thereof, which defines the said opening.

In a further embodiment of the optical system of the invention it can also be provided that for designing an in-coupling optical element a prism is arranged between the flat light guide and the point light source in optical contact with a surface of the flat light guide so that light is introduced on the light entry side of the prism, which light enters into the flat light guide in an acute-angled manner on the opposite side via the optical contact between the prism and the flat light guide.

It is particularly preferable if the system of the invention is not only adapted for in-coupling light from a single point light radiator but also for in-coupling light from a plurality of such point light radiators such as LEDs. Preferably, such an optical system which is configured according to the invention comprises a dedicated optical element for each one of these point light sources on a surface of the flat light guide, the optical element coupling the light from the associated point light source into the flat light guide as described. The arrangement of the point light sources above the flat light guide as well as the arrangement of the associated optical elements can be specifically adapted to the individual lighting job. For example, such a plurality of point light sources can be equidistantly arranged in a plurality of rows and columns over a predetermined region or the entire surface of the flat light guide, with the advantage that a particularly homogeneous light distribution with high intensity can be obtained in the light guide. The optical elements of such an inventive optical system for in-coupling light from a plurality of point light sources can be designed in the above-described manner, and it is also easily possible, depending on the specific application, to incorporate several differently constructed optical elements in a single optical system so that for instance in one part of the surface of the flat light guide the light from several light sources is used via optical elements of one kind while in a different part of the surface of the light guide the light from other point light sources is used via optical elements of a different kind.

Figure 2:
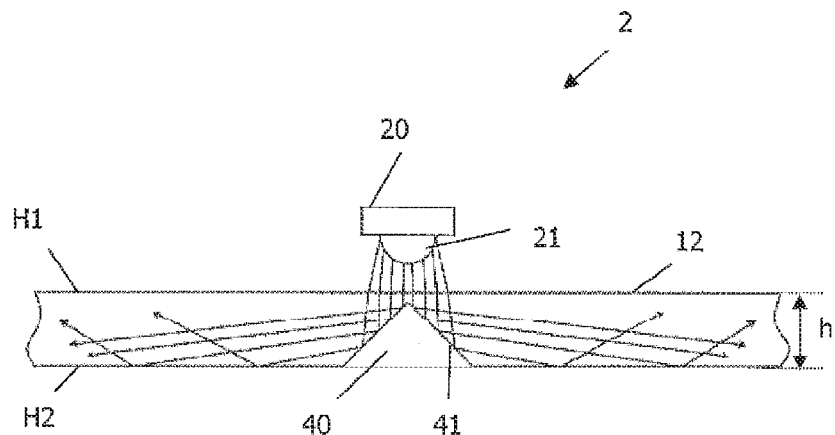
Figure 3:
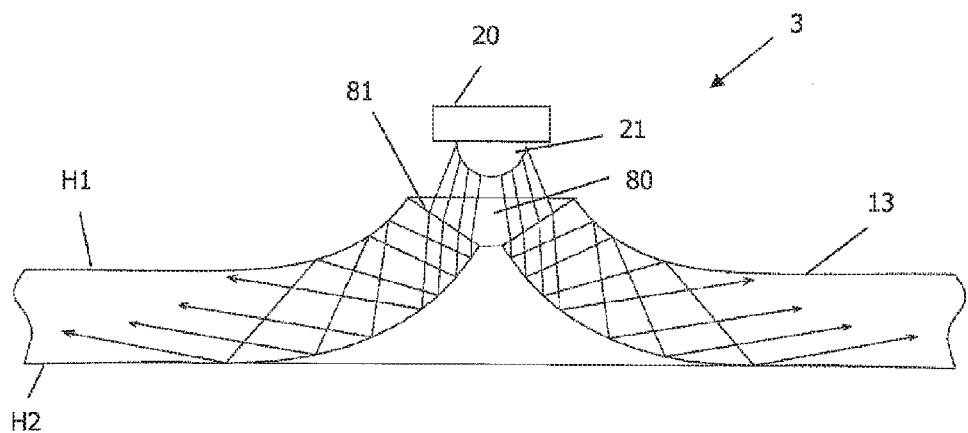
Figure 4:
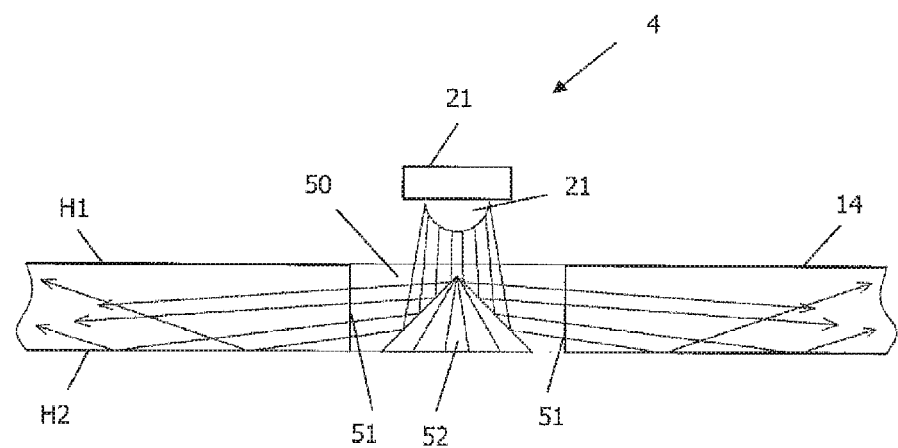
Figure 5:
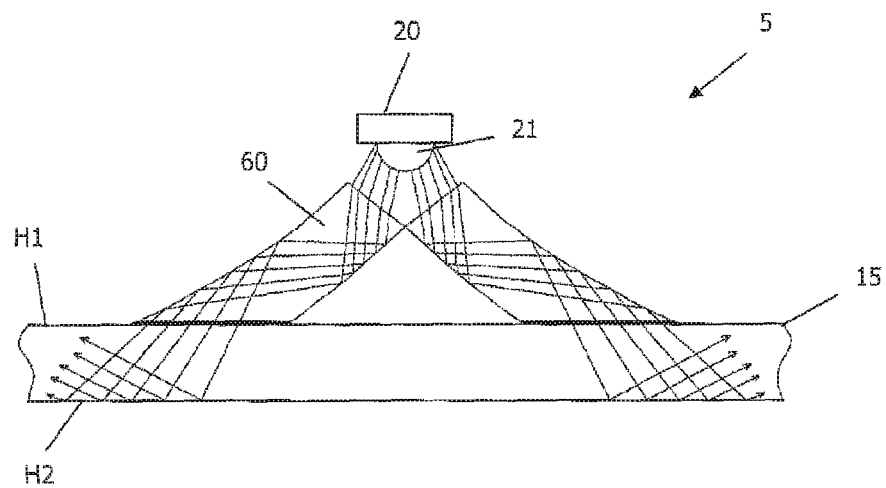
Figure 6:
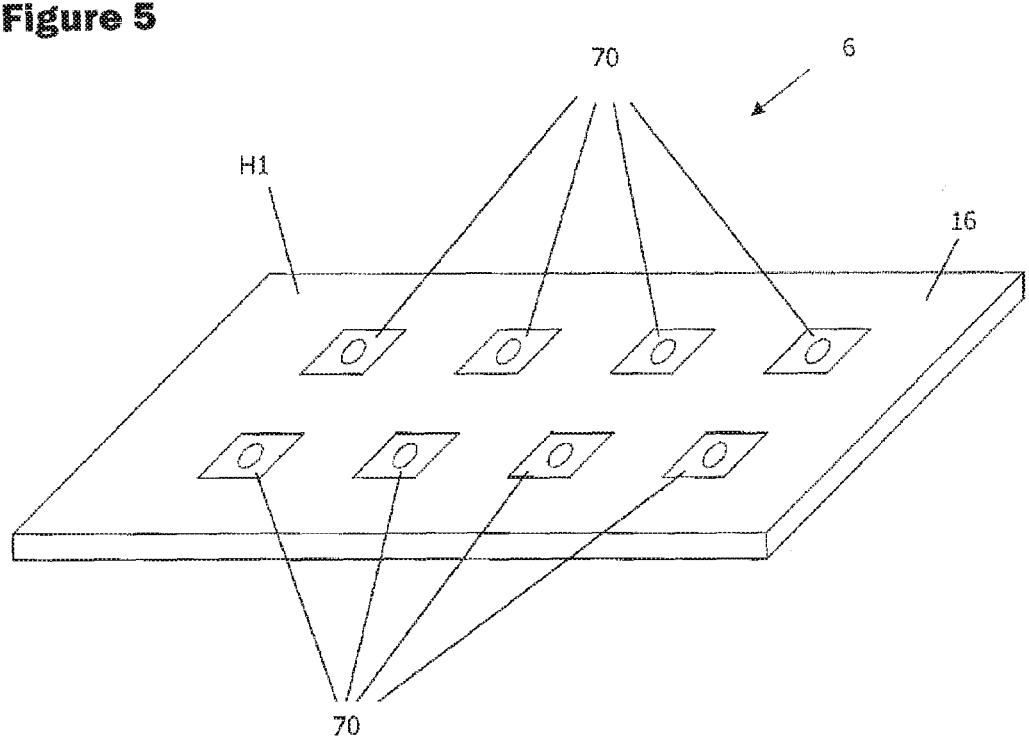

Embodiments of the invention will now be described in more detail with reference to the attached drawing Figures wherein it is shown by:

FIG. 1 a sectional view of an optical system according to the invention in a first embodiment;

FIG. 2 a sectional view of an optical system according to the invention in a second embodiment;

FIG. 3 a sectional view of an optical system according to the invention in a third embodiment;

FIG. 4 a sectional view of an optical system according to the invention in a fourth embodiment;

FIG. 5 a sectional view of an optical system according to the invention in a fifth embodiment; and FIG. 6 a perspective view of an optical system according to the invention in a sixth embodiment.

The optical system of the invention for in-coupling light from at least one point light source such as LED at least comprises the said flat light guide and a number of optical elements corresponding to the number of the employed point light sources, with which optical elements the light from the associated point light sources can be coupled into the flat light guide at a surface thereof.

The light which is coupled into the flat light guide can then be out-coupled at any position of a major surface of the flat light guide, for instance by a roughening or structuring of said surface, wherein out-coupling can take place at the same major surface as in-coupling or also at the opposing major surface. In one embodiment, the optical system of the invention can comprise in addition to the flat light guide and in addition to said one or more optical coupling element(s) also said one or more point light source(s) such as one or more LED(s).

Depending on the embodiment, the flat light guide which is transparent at least with respect to the light emitted from the point light source is made of a glass material or of plastic like plexiglass. The flat light guide can be plate-like and particularly have a constant height. The flat light guide can be plane with respect to one major surface, at least in sections, or also curved.

The optical systems constructed according to the invention which are described in the following could be used particularly for rendering a distribution of light that is emitted from one or more LEDs in corresponding LED lamps homogeneous.

The first embodiment as illustrated in FIG. 1 shows an optical system 1 comprising a flat light guide 11 which is made of a transparent plastic and the height h thereof is much smaller compared to the dimensions (not illustrated) in the two directions vertical to it. In the embodiment illustrated in FIG. 1 and also in the further embodiments which are described in the following both surfaces or major surfaces H1, H2 of the respective flat light guide are designed flat and parallel to each other.

In the condition of the optical system 1 of FIG. 1 installed in a lamp, a LED device 20 is arranged above the surface H1 which includes a lens 21 focusing the light emitted from the light-emitting layer of the LED and directing it into a recess 30 formed in the flat light guide and defined by at least one associated boundary surface 31. In the example illustrated in FIG. 1, said recess 30 has a cone-like shape so that the associated boundary surface 31 is closed and defines the recess of the cone. Since the lens 21 is semispherical, the recess 30 is adapted to a corresponding rotation symmetry of the light source. Also the angle of the boundary surface 31 to the surface H2 is adapted for optimizing the light input in the flat light guide.

As shown by FIG. 1, during entry into the flat light guide 11, the light rays emerging from the lens 21 of the LED 20 are refracted at the boundary surface 31 towards the perpendicular and are subsequently reflected on both surfaces H1, H2 because of total internal reflection so that the light is captured within the flat light guide 1. In the described embodiment, air is present between the emergent surface of the lens 21 and the boundary surface 31 of the flat light guide, while in other embodiments also a different medium can be used for improving in-coupling, for example a fluid having a refraction index >1. The latter also applies to the embodiments which will be described in the following.

FIG. 2 illustrates a further embodiment of an optical system 2 constructed according to the invention, which system again uses a LED device 20 as a point light source in which light is radiated to the outside via a lens 21. Differently from the embodiment illustrated in FIG. 1, a recess 40 is provided here on the surface H2, which is turned away from the LED 20. This recess 40 is again provided by a cone-shaped boundary surface 41 that is adapted to the semispherical shape of the lens 21 as in the first-described embodiment. The ascending slope of the boundary surface 41 to the surface H2 is chosen in such a manner that the light which penetrates into the flat light guide 12 at the surface H1 is totally reflected on the boundary surface 41 and thus remains inside the flat light guide 12.

In an embodiment which is not illustrated, the boundary surface 41 can also have a reflective coating for reflecting the light into the volume of the flat light guide.

FIG. 3 illustrates a further optical system 3 which is constructed according to the invention and in which the flat light guide 13 includes in the region of the LED device 20 arranged above it a rotation-symmetric local elevation with a cone-shaped recess in its center, wherein the light from the LED 20 is coupled into the flat light guide 13 via the boundary surface of the recess.

FIG. 4 illustrates a further embodiment of an optical system which is constructed according to the invention and in which the flat light guide 14 includes a recess such as a hole. In the described embodiment said hole 50 is circular with a cylindrical boundary surface 51, corresponding to the rotation symmetry of the semispherical lens 21 of the associated LED device, and a mirror element in the form of a reflecting cone 52 is placed in said recess as shown in FIG. 4. This reflecting cone 52 may for instance have a surface that is provided with a reflective coating by means of vapor deposition. In a modification of this embodiment it can also be provided for the reflecting cone 52 to be directly incorporated in the flat light guide without the necessity of forming a complete hole in the flat light guide 14. In both cases, the light which leaves the LED device 20 through the lens 21 is reflected on the outer surface of the reflecting cone 52 and is introduced in the flat light guide 14 at the boundary surface 51.

A further embodiment of an optical system 5 constructed according to the invention is illustrated in FIG. 5 together with a LED device 20 as a point light source.

In this embodiment, a prism 60 is arranged between the LED 20 and the flat light guide 15, which prism is optically contacted with the flat light guide 15 at the surface H1, wherein the light from the LED device is introduced at the light entering surface of the prism and enters into the flat light guide 15 on the opposite side in an acute-angled manner via said optical contact.

FIG. 6 illustrates an embodiment of an optical system 6 which is constructed according to the invention and which is adapted for introducing in the flat light guide 16 light from a plurality of mutually spaced point light sources (not shown) arranged for example in rows or columns above a surface of the flat light guide 16. For this purpose, a corresponding optical element 70 is respectively provided on the light guide for each of the point light sources, which optical element introduces the light from the associated point light source in the flat light guide 16 at the surface H1 thereof. The optical elements which are thus also arranged in rows or columns on or in the flat light guide can all be constructed identically or also differently. Normally, all the above-mentioned designs of optical coupling elements can be used for in-coupling the light.

LIST OF REFERENCE NUMBERS 1-6 optical system
11-16 flat light guide
21 LED device
21 lens
30 recess
31 boundary surface
40 recess
41 boundary surface
50 hole
51 boundary surface
52 reflecting cone
60 prism
70 optical element
80 recess
81 boundary surface
h height
H1, H2 surface

What is claimed is:

1. An optical system comprising a flat, plate-like light guide made of a transparent material for coupling light from at least one approximately point light source into the flat, plate-like light guide wherein:
   the point light source is arranged above a first surface of the flat, plate-like light guide and is associated with an optical element that in-couples light from the point light source into the flat, plate-like light guide;
   the in-coupled light satisfies the conditions of the critical angle for total reflection and remains inside the flat, plate-like light guide until controlled out-coupling;
   the optical element comprises a recess in the first surface; and
   a reflective cone is directly incorporated in the flat, plate-like light guide within the recess, wherein the reflective cone comprises an outer surface with a reflective coating disposed thereon, and is configured to reflect light from said point light source, so as to couple light from the point light source into the flat, plate-like light guide.

2. The optical system according to claim 1, wherein:
   said optical system comprises a plurality of point light sources arranged above the first surface of the flat, plate-like light guide; and
   each point light source is associated with a respective optical element that couples light from its associated point light source into the flat, plate-like light guide.

3. The optical system of claim 1, wherein the point light source comprises a light emitting diode.

4. The optical system of claim 1, wherein the transparent material is selected from the group consisting of glass, plastic, and combinations thereof.

5. The optical system of claim 1, wherein:
   said reflective cone comprises a relatively wide region and a relatively narrow region
   said reflective cone is tapered from said relatively wide region to said relatively narrow region; and
   said relatively narrow region is proximate said first surface of said flat, plate-like light guide.

* * * * *